(12) United States Patent  (10) Patent No.:     US 7,311,349 B1
Assariri  (45) Date of Patent:     Dec. 25, 2007

(54) REMOVABLE SUNSHADE INSERT

(76) Inventor: Fawaz Assariri, 1157 Alameda Ave., Apt. 9, Glendale, CA (US) 91201

( * ) Notice: Subject to any disclaimer, the term of this patent is extended or adjusted under 35 U.S.C. 154(b) by 0 days.

(21) Appl. No.: 11/218,891

(22) Filed:     Sep. 2, 2005

(51) Int. Cl.
    *B60J 3/00*     (2006.01)
(52) U.S. Cl. .................................... 296/97.7; 296/97.1
(58) Field of Classification Search ............... 296/97.7, 296/97.1
    See application file for complete search history.

(56)         References Cited

U.S. PATENT DOCUMENTS

| | | | | |
|---|---|---|---|---|
| 4,172,613 A | * | 10/1979 | Furando | 296/97.7 |
| 4,202,396 A | * | 5/1980 | Levy | 160/107 |
| 4,652,039 A | * | 3/1987 | Richards | 296/97.7 |
| 4,763,947 A | * | 8/1988 | Gregg | 160/370.23 |
| 4,777,994 A | * | 10/1988 | Nederveld | 160/84.04 |
| 4,838,335 A | * | 6/1989 | Eskandry et al. | 160/84.04 |
| 4,923,239 A | * | 5/1990 | Wischusen et al. | 296/97.7 |
| 4,958,880 A | * | 9/1990 | Champane | 296/97.7 |
| 5,004,285 A | * | 4/1991 | Bennett | 160/370.23 |
| 5,046,543 A | * | 9/1991 | Levy | 160/84.04 |
| 6,213,303 B1 | * | 4/2001 | Harris et al. | 206/581 |

* cited by examiner

*Primary Examiner*—Joseph D. Pape
(74) *Attorney, Agent, or Firm*—Wagner, Anderson & Bright LLP; Roy L. Anderson

(57)         ABSTRACT

A removable sun shade insert for a vehicle that is a substantially planar sun block with an insertion slot for holding the sun block in place in which the sun block and the insertion slot are sized so that the sun block is held in place against a windshield by a rear view mirror when the insertion slot is engaged with the rear view mirror. The insert can be detachably connected to a bound magazine and contain customizable advertisements. The insert can provide shade for either the driver's or a passenger's side of the vehicle, or even a side window.

20 Claims, 1 Drawing Sheet

REMOVABLE SUNSHADE INSERT

FIELD OF THE INVENTION

This invention is in the field of shades for blocking sun used in motor vehicles when they are in operation.

BACKGROUND OF THE INVENTION

It has long been known that sun can cause a hazard to drivers of motor vehicles when they are operating motor vehicles. Although sunglasses can block some of the sun's rays, they do not provide a complete solution when the sun is directly in the driver's eyes, especially during sunrise or sunset. To help partially offset this problem, cars and trucks typically have windshield sun visors at the driver's and front passenger's seats. These visors are designed so that they can be folded upwardly toward the roof when not in use and brought down to a maximum vertical position (relative to the floor) when needed. Also, the visors are typically oriented so that they can be rotated away from the windshield toward a side door window to block sun from a side direction.

While windshield visors are a vast improvement over no visor, they typically leave gaps between the visor and the rearview mirror. It is this gap that is addressed by the present invention.

In addition to providing a useful article, the present invention is also concerned with an improved method of advertising. Free promotional items are a popular way of getting brand names and new ideas before consumers. In fact, there is a whole industry and trade shows directed to gifts that companies can brand and give away to customers or potential customers, and it is hard to imagine somebody today in the United States that has not received a free calendar or a free pen with somebody's advertising material placed on it. To be useful as an effective giveaway product, companies often look for something that is both inexpensive and yet something that consumers are likely to find useful and to keep around, thus increasing the longevity of the advertising. Other examples of such items include magnets, the ubiquitous branded coffee cups and clothing, such as baseball caps and t-shirts, although such clothing is more expensive and not as subject to mass distribution as items that can be conveniently and cheaply delivered through the mail.

In recent years magazines have been including more and more sophisticated advertisements, including special pull-out inserts that can be bonded onto a special strip inserted into the magazines. This method of delivery offers a convenient and relatively inexpensive method of getting specialized promotional materials to targeted audiences of magazines such as, e.g., perfume or deodorant. However, despite its potential, it cannot be used to deliver items such as pens or coffee cups, and the magazine size and dimensions limit the type of insert that can be added to a magazine. To be effective, the insert should be flat, sized so that it does not exceed the dimensions of the magazine, and not be so thick as to detract from the main purpose of the magazine, which is not simply to provide the insert, but to provide content that viewers are interested in viewing.

Accordingly, it is another object of the present invention to provide a giveaway type of promotional item that is unique, and therefore likely to be appreciated and kept by consumers, that can be delivered as an insert to a magazine.

SUMMARY OF THE INVENTION

The present invention is generally directed to a removable sun shade insert for a vehicle that is a substantially planar sun block with an insertion slot for holding the sun block in place in which the sun block and the insertion slot are sized so that the sun block is held in place against a windshield by a rear view mirror when the insertion slot is engaged with the rear view mirror.

In a first, separate group of aspects of the present invention, the insertion slot is sized so that the sun block (which may be made of a plastic or paper material) is held in place to provide shade for either the driver's or a passenger's side of the vehicle when the insertion slot is engaged with a visor that is extended to the side of the vehicle, and the sun block may also be attached to a windshield visor so that it provides a sun block for a side mirror. The sun block and the insertion slot are substantially rectangular and the insertion slot can be sized so that its dimensions are approximately half an inch by four inches.

In a second, separate group of aspects of the present invention, the sun shade insert is detachably connected to a bound magazine and can contain customizable advertisements visible when the sun block is detached from the bound magazine and held against a window windshield.

Accordingly, it is a primary object of the present invention to provide an improved removable sunshade insert.

This and further objects and advantages will be apparent to those skilled in the art in connection with the drawings and the detailed description of the invention set forth below.

DETAILED DESCRIPTION OF THE INVENTION

Figure 1:
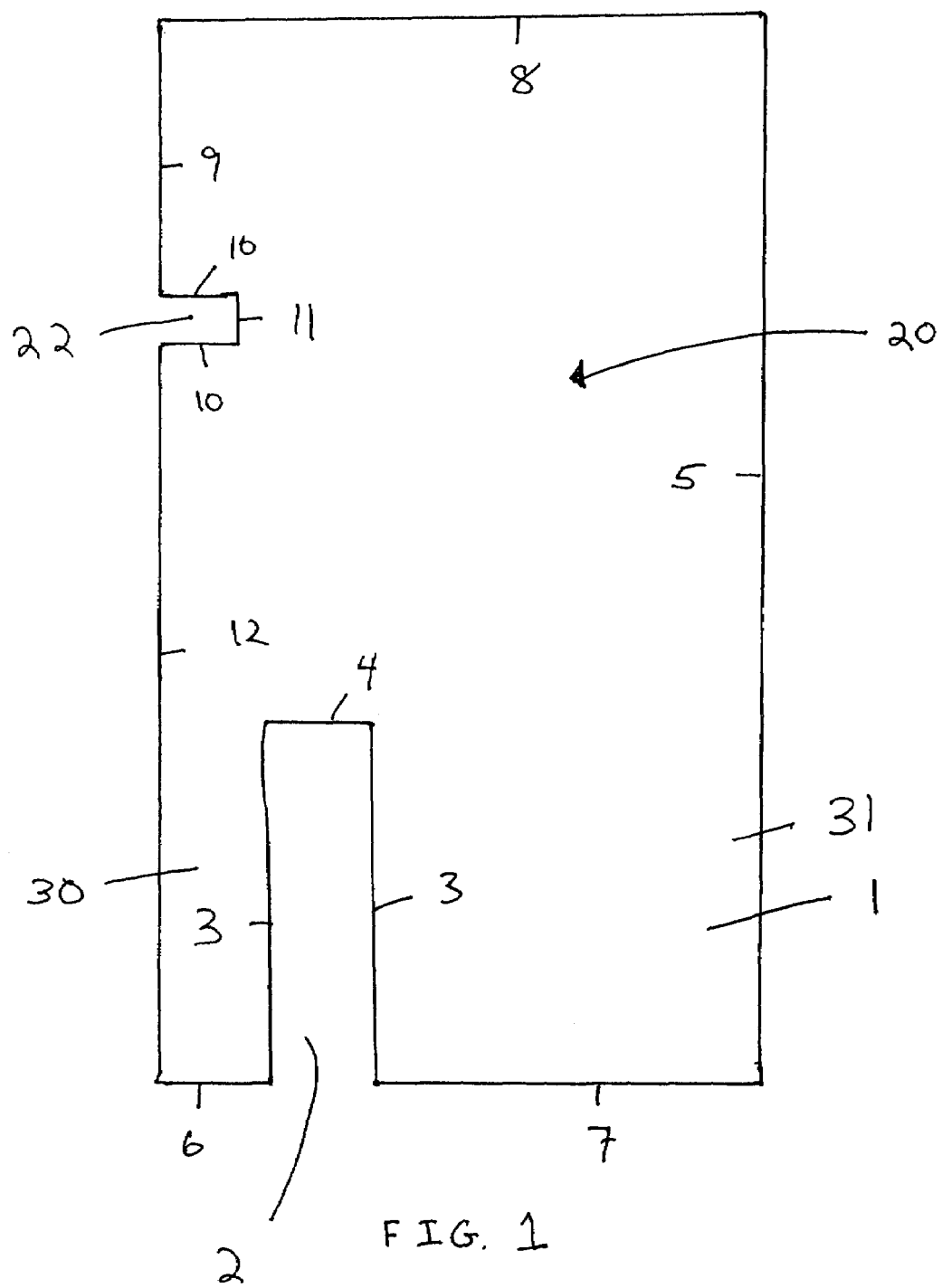
FIG. 1 is a top planar view of an embodiment of the present invention.

The present invention will now be discussed in connection with a preferred embodiment shown in FIG. 1.

FIG. 1 shows a sun shade block 1 for a vehicle. The sun block is substantially planar and rectangular, and it is especially preferred that it be made of a paper or plastic material. Sun shade block 1 is preferably sized so that it can be delivered as an insert to a magazine. The insert can be attached to the magazine by any known means in use today, the most preferred method probably being a temporary removable adhesive.

Sun shade block 1 has an insertion slot 2 and a rearview mirror slot 22. Insertion slot 2 is sized so that sun shade block 1 is held in place against a windshield by a rear view mirror and a windshield visor when insertion slot 2 is engaged with the rear view mirror by sliding the slot into and against the rear view mirror. Sun shade block 1 can be used to block sun on either the driver's side or the passenger side, and in this sense is completely reversible since. Also, because the only mechanism for holding sun block 1 in place that is required in sun shade block 1 is slot 2, sun shade block 1 has a very simple and inexpensive construction that makes it ideal for delivery in a magazine as an insert.

When sun shade block 1 is used in a vehicle, it blocks sun that might otherwise enter the inner cab of the vehicle between gaps located between the rearview mirror and a windshield visor. This additional shade may not only be useful to the driver, but also useful to other passengers as well. In addition, sun shade block 1 can be attached by use of a rubber band to further secure sun shade block 1 by inserting the rubber band (not shown) over strip 30 and the rear view mirror. If sun block 1 is to be used for shade on a side window, a rubber band can be used to secure sun shade block 1 by attaching around the visor and strip 31. Also, in some vehicles, sun shade block 1 can be held in place by use of rearview mirror slot 22 in which case edge 11 would sit atop the rearview mirror connection.

To give a better appreciation for an especially preferred embodiment of the present invention, dimensions for a sun shade block 1 that can be used as a magazine insert are as follows.

3 4 inches
4 ½ inch
5 11 inches
6 1¼ inches
7 5¼ inches
8 7 inches
9 3½ inches
10 1 inch
11 ½ inch
12 7 inches While such dimensions are especially preferred, they need not be exact; instead, so long as insertion slot 2 and rear view mirror slot 22 serve their intended purpose, alternative dimensions will also suffice.

Sun shade block 1 has a large area, designated generally as 20 (on both of its sides, front and back), that is suitable for advertising or branding materials. For example, a logo can be prominently displayed in this area, or some other form of advertising, which is visible when sun shade block 1 is detached from a bound magazine and held against the windshield. However, although much has been made of the fact that sun shade block 1 can be delivered by means of being an insert to a magazine, it can also be distributed or sold apart from magazines, and it would also make a perfect item to be sold or given away at convenience locations or gas stations.

While the invention has been described herein with reference to an especially preferred embodiment, this embodiment has been presented by way of example only, and not to limit the scope of the invention. Additional embodiments thereof will be obvious to those skilled in the art having the benefit of this detailed description, especially to meet specific requirements or conditions. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A removable sun shade insert for a vehicle for use while the vehicle is in operation, comprising:

a substantially planar sun block having a rear view mirror slot along a lower bottom lengthwise side of the sun block and an insertion slot along a side end of the sun block;

wherein the sun block and the rear view mirror slot are sized so that the sun block is held in place against a windshield by a rear view mirror when the rear view mirror slot is engaged with the rear view mirror; and wherein the insertion slot is sized so that the sun block can be held against the windshield by the rear view mirror when the insertion slot is engaged with the rear view mirror; and wherein the sun block is sized so as to block sun that might otherwise enter an inner cab of the vehicle between a gap located between the rearview mirror and a windshield visor.

2. The removable sun shade of claim 1, wherein the insertion slot is sized so that the sun block can be held in place to provide shade for a side window of the vehicle when the insertion slot is engaged with the windshield visor extended toward the side window.

3. The removable sun shade of claim 2, wherein the sun block is substantially rectangular.

4. The removable sun shade of claim 3, wherein the insertion slot is substantially rectangular.

5. The removable sun shade of claim 4, wherein the insertion slot is comprised of a short dimension of approximately half an inch and a long dimension of approximately four inches.

6. The removable sun shade of claim 5, wherein the sun block is detachably connected to a bound magazine as a magazine insert.

7. The removable sun shade of claim 6, wherein the sun block contains a customizable advertisement that is visible when the sun block is detached from the bound magazine and held against the windshield.

8. The removable sun shade of claim 5, wherein the sun block has a long length of approximately eleven inches and a short length of approximately seven inches.

9. The removable sun shade of claim 8, further comprising a securing means for securing the sun block in place to provide shade for the side window of the vehicle when the insertion slot is engaged with the windshield visor extended toward the side window.

10. The removable sun shade of claim 9, wherein the securing means is a rubber band.

11. A removable sun shade insert for a vehicle for use while the vehicle is in operation, comprising:

a substantially planar and substantially rectangular sun block having a rear view mirror slot along a lower bottom lengthwise side of the sun block proximate to a first side end and an insertion slot along a second side end of the sun block;

wherein the sun block and the rear view mirror slot are sized so that the sun block is held in place against a windshield by a rear view mirror when the rear view mirror slot is engaged with the rear view mirror; and wherein the insertion slot is sized so that the sun block can be held against the windshield by the rear view mirror when the insertion slot is engaged with the rear view mirror or be held in place to provide shade for a side window of the vehicle when the insertion slot is engaged with a windshield visor extended toward the side window; and wherein the sun block is sized so as to block sun that might otherwise enter an inner cab of the vehicle between a gap located between the rearview mirror and the windshield visor when the sun block is held in place against the windshield by the rear view mirror.

12. The removable sun shade of claim 11, wherein the sun block is detachably connected to a bound magazine as a magazine insert.

13. The removable sun shade of claim 11, wherein the insertion slot is substantially rectangular and comprised of a short dimension of approximately half an inch and a long dimension of approximately four inches and the sun block has a long length of approximately eleven inches and a short length of approximately seven inches.

14. The removable sun shade of claim 13, wherein the rear view mirror slot begins approximately three and a half inches from the first side end.

15. The removable sun shade of claim 11, wherein the sun block contains a customizable advertisement that is visible when the sun block is detached from the bound magazine and held against the windshield.

16. The removable sun shade of claim 11, further comprising a securing means for securing the sun block in place to provide shade for the side window of the vehicle when the insertion slot is engaged with the windshield visor extended toward the side window.

17. A removable sun shade insert for a vehicle for use while the vehicle is in operation, comprising:

a substantially planar and substantially rectangular sun block having a length of approximately eleven inches and a width of approximately seven inches, said sun block having a rear view mirror slot along a lower bottom lengthwise side of the sun block proximate to a first side end and an insertion slot along a second side end of the sun block;

wherein the rear view mirror slot begins approximately three and a half inches from the first side end and is sized so that the sun block is held in place against a windshield by a rear view mirror when the rear view mirror slot is engaged with the rear view mirror; and wherein the insertion slot is substantially rectangular and comprised of a short dimension of approximately half an inch and a long dimension of approximately four inches, the insertion slot beginning approximately one inch from lower bottom lengthwise side of the sun block.

18. The removable sun shade of claim 17, wherein the sun block is detachably connected to a bound magazine as a magazine insert.

19. The removable sun shade of claim 17, further comprising a securing means detachably connected to the sun shade insert for securing the sun block in place to provide shade for the side window of the vehicle when the insertion slot is engaged with the windshield visor extended toward the side window.

20. The removable sun shade of claim 19, wherein the securing means is a rubber band.

* * * * *

UNITED STATES PATENT AND TRADEMARK OFFICE
CERTIFICATE OF CORRECTION

| | | |
|---|---|---|
| PATENT NO. | : 7,311,349 B1 | Page 1 of 1 |
| APPLICATION NO. | : 11/218891 | |
| DATED | : December 25, 2007 | |
| INVENTOR(S) | : Assariri | |

It is certified that error appears in the above-identified patent and that said Letters Patent is hereby corrected as shown below:

On the title page (76):
The correct spelling of the inventor's last name is "Assafiri" instead of --Assariri.--

Signed and Sealed this

Sixth Day of May, 2008

JON W. DUDAS
*Director of the United States Patent and Trademark Office*